United States Patent
Benfield et al.

(10) Patent No.: US 7,922,138 B2
(45) Date of Patent: Apr. 12, 2011

(54) DENTAL APPARATUS HAVING AN ADJUSTABLE ARTICULATED ARM

(75) Inventors: Tom Benfield, Kings Creek, SC (US); Joe Bria, Waxhaw, NC (US)

(73) Assignee: Dental Equipment, LLC, Charlotte, NC (US)

( * ) Notice: Subject to any disclaimer, the term of this patent is extended or adjusted under 35 U.S.C. 154(b) by 374 days.

(21) Appl. No.: 12/250,817

(22) Filed: Oct. 14, 2008

(65) Prior Publication Data
US 2010/0092917 A1 Apr. 15, 2010

(51) Int. Cl.
*E04G 3/00* (2006.01)

(52) U.S. Cl. .......... 248/276.1; 248/281.11; 248/292.12; 248/371; 248/585

(58) Field of Classification Search ................ 248/276.1, 248/281.11, 280.11, 274.1, 284.1, 292.11, 248/292.12, 682, 585, 123.11, 133, 371, 248/372.1, 162.1; 284/176.1, 176.3; 361/679.01, 361/679.02, 679.06, 679.21, 679.23, 681; 16/343, 347, 360
See application file for complete search history.

(56) References Cited

U.S. PATENT DOCUMENTS

| | | | |
|---|---|---|---|
| 3,160,379 A | 12/1964 | Gardella | |
| 3,813,147 A | 5/1974 | Rick | |
| RE31,548 E | 4/1984 | Watanabe | |
| 4,443,194 A | 4/1984 | Fuchs | |
| 4,934,933 A | 6/1990 | Fuchs | |
| 5,340,072 A * | 8/1994 | Halbirt | 248/279.1 |
| 5,399,007 A | 3/1995 | Marconet | |
| 5,435,515 A * | 7/1995 | DiGiulio et al. | 248/576 |
| 6,152,735 A | 11/2000 | Meyer | |
| 6,575,644 B2 * | 6/2003 | Paddock et al. | 396/421 |
| 6,692,253 B2 | 2/2004 | Brockway et al. | |
| 7,195,219 B2 * | 3/2007 | Irwin et al. | 248/284.1 |
| 7,726,616 B2 * | 6/2010 | Zhang et al. | 248/284.1 |

FOREIGN PATENT DOCUMENTS

DE    70 30 982    11/1970

* cited by examiner

*Primary Examiner* — Terrell McKinnon
*Assistant Examiner* — Todd M. Epps
(74) *Attorney, Agent, or Firm* — Timothy H. Van Dyke; Beusse Wolter Sanks Mora & Maire

(57) ABSTRACT

Disclosed herein is a dental apparatus having a flexible arm for a dental apparatus. A benefit of the inventive flexible arm is the ability to make fine adjustments in orientation of one end of the arm relative to the other. More specifically, the ability to adjust or optimize the horizontal attitude of a movable end of the arm quickly and easily without resorting to expensive and time consuming remanufacture of the arm components. Adjustment of the end of the arm is accomplished via an adjusting mechanism with a rotatable shaft having an offset pin, where rotation of the shaft caused the pin to translate as defined by the offset of the pin center relative to the shaft center.

17 Claims, 4 Drawing Sheets

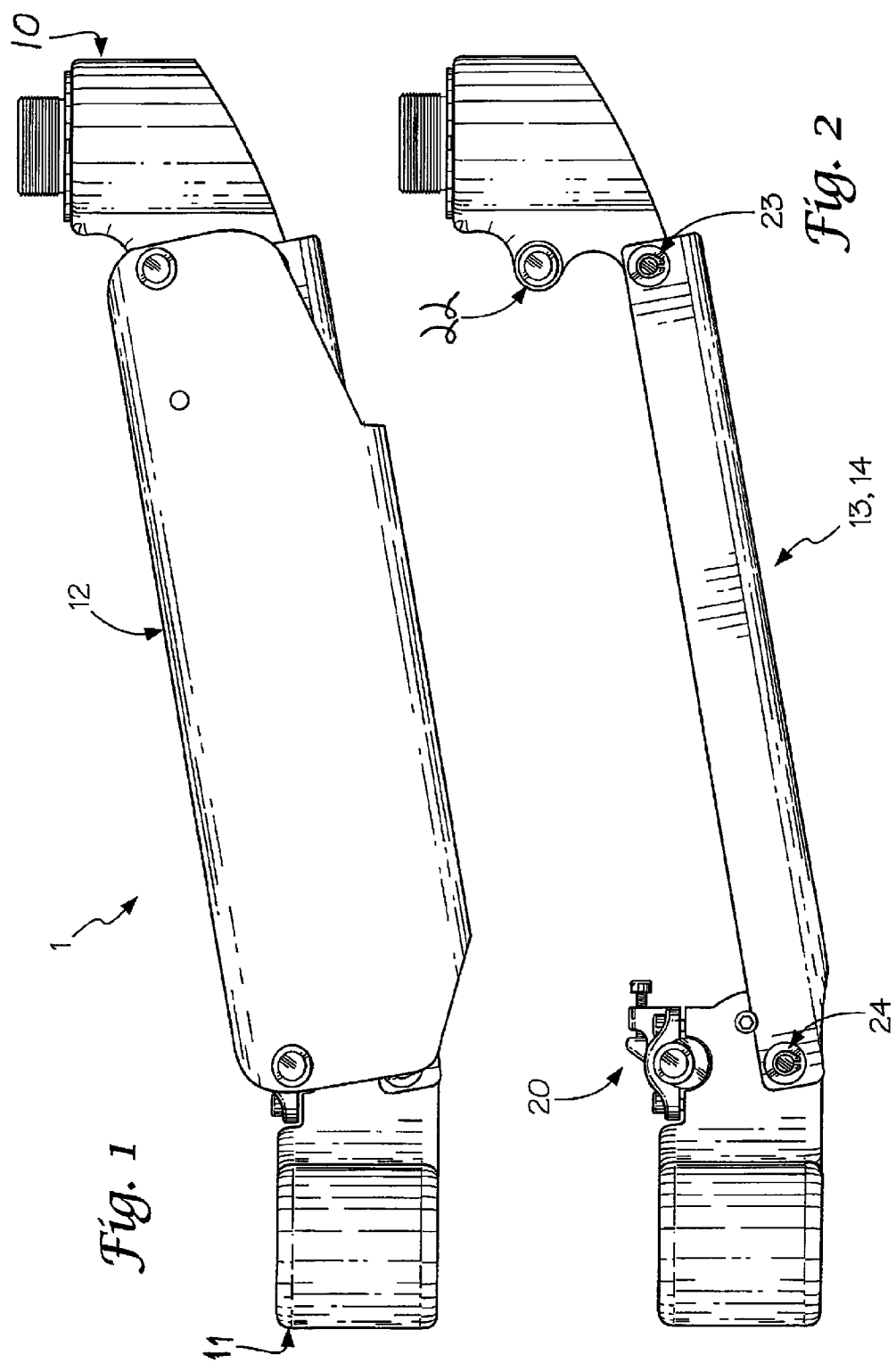

DENTAL APPARATUS HAVING AN ADJUSTABLE ARTICULATED ARM

FIELD OF THE INVENTION

The present invention provides a dental apparatus that includes an articulated arm for supporting dental equipment in a generally horizontal position, and having a feature for adjusting the horizontal orientation of the arm support.

BACKGROUND OF THE INVENTION

Traditionally, dental examination offices have a platform that can be used for a multitude of functions including holding equipment for assisting the dental staff during patient procedures. The platform desirably provides a stable surface for the dental staff to place objects during procedures and is moveable in space to suit a multitude of locations. Preferably, the movable orientation of the platform does not deviate from the horizontal when the platform is moved from one location to another. The Kinematic arrangement known as a 4-bar linkage can be employed to support the movable platform such that the orientation of the moveable end is constant relative to the horizon. However, due to manufacturing tolerances and imperfections, an ideal orientation of the platform may not be achieved using traditional designs.

SUMMARY OF THE INVENTION

The present invention provides a dental apparatus that includes an articulated arm and having a feature for adjusting the horizontal orientation of the support offered by the dental arm.

According to one embodiment, the flexible arm has a base body and a movable body having a cylindrical lower bearing surface arranged at an end of the movable body, a shaft having an outer cylindrical surface arranged to mate with the lower bearing surface of the body and an axial hole where a center of the axial hole is arranged parallel and off-center to a central rotational axis of the shaft. A pin is arranged in the axial hole and has an outer surface arranged to mate with the axial hole. The length of the pin is greater than a length of the shaft. The pin also has a pin first end, a pin second end arranged opposite the first end, and a pin elongated portion arranged between the pin first end and the pin second end. The embodiment includes a plurality of links connecting the base body to the movable body that are constructed and arranged such that rotation of the shaft causes translation of the cylindrical pin in a plane perpendicular to the shaft axis of rotation resulting in adjustment of an angular orientation of the movable body relative the horizon. Furthermore, the pin of the flexible arm can be a cylindrical pin. The flexible arm may further include an actuating device that induces the shaft to rotate by linearly applying a force to the shaft. The flexible arm may further include a stop arrangement arranged on the shaft that interacts with the actuating device and the actuating device may be an adjusting screw. The flexible arm may also include the plurality of links comprising a four-bar linkage arrangement and where the top link has an inverted U-shaped cross-section and acts as a cover for the arm.

According to another embodiment the dental apparatus includes an adjustable articulated arm including a first body and a second body arranged opposite the first body. The second body has a cylindrical lower bearing surface arranged at an end of the second body, a shaft having an outer cylindrical surface arranged to mate with the lower bearing surface of the second body, and an axial hole where a center of the axial hole is arranged parallel and off-center to a central rotational axis of the shaft. A pin is arranged in the axial hole having an outer surface arranged to mate with the axial hole. The pin includes a pin first end, a pin second end arranged opposite the first end, and a pin elongated portion arranged between the pin first end and the pin second end, wherein a pin length is greater than a shaft length, a plurality of links that pivotably connect the first body to the second body such that a horizontal orientation of the second body is generally constant relative to the first body. The embodiment also includes a position control device that controls a rotational position of the shaft relative to the second body, wherein the position control device adjusts a horizontal orientation of the second body relative to the first body. The adjustable articulated arm may further include the position control device comprising an actuating device that applies a force to the shaft that induces the shaft to rotate or the position control device further comprising a stop arrangement arranged on the shaft that interacts with the actuating device. The adjustable articulated arm may be arranged such that rotation of the shaft causes translation of the cylindrical pin relative to the second body and where the actuating device actuates the shaft in a linear fashion. In a specific embodiment the actuating device is an adjusting screw and the plurality of links comprise a four-bar linkage arrangement and the top link has an inverted U-shaped cross-section that acts as a cover for the arm.

Another aspect of the invention is a method of adjusting an orientation of a flexible dental arm, comprising providing a first body, a second body arranged opposite the second body, and an adjustment mechanism arranged on the second body, attaching the first and second bodies via a plurality of links such that the second body is translatable relative to the first body without rotation, where at least one link pivotally attaches to the adjustment mechanism, and actuating the adjustment mechanism causing translation of the pivot attachment of the adjusting mechanism resulting in a change in the horizontal orientation of the second body. The second body may include a cylindrical lower bearing surface arranged at an end of the second body that is constructed to mate with a shaft of the adjustment mechanism. Further, a specific embodiment includes an axial hole in the shaft arranged parallel and off-center to a central rotational axis of the shaft whereby the hole supports a pin that acts as the pivot attachment. The method may also include an embodiment where actuating the adjustment mechanism induces rotation in the shaft.

BRIEF DESCRIPTION OF THE DRAWINGS

The above-mentioned and other concepts of the present invention will now be described with reference to the drawings of a preferred embodiment of the present invention of the flexible arm for a dental apparatus and a method for adjusting a flexible dental arm. The illustrated embodiments of the flexible arm and method are intended to illustrate, but not limit the invention. The drawings contain the following figures:

FIG. 1 shows a side view of the flexible arm;

FIG. 2 shows the flexible arm in FIG. 1 with the cover link removed for clarity;

DETAILED DESCRIPTION OF THE INVENTION

Figure 3:
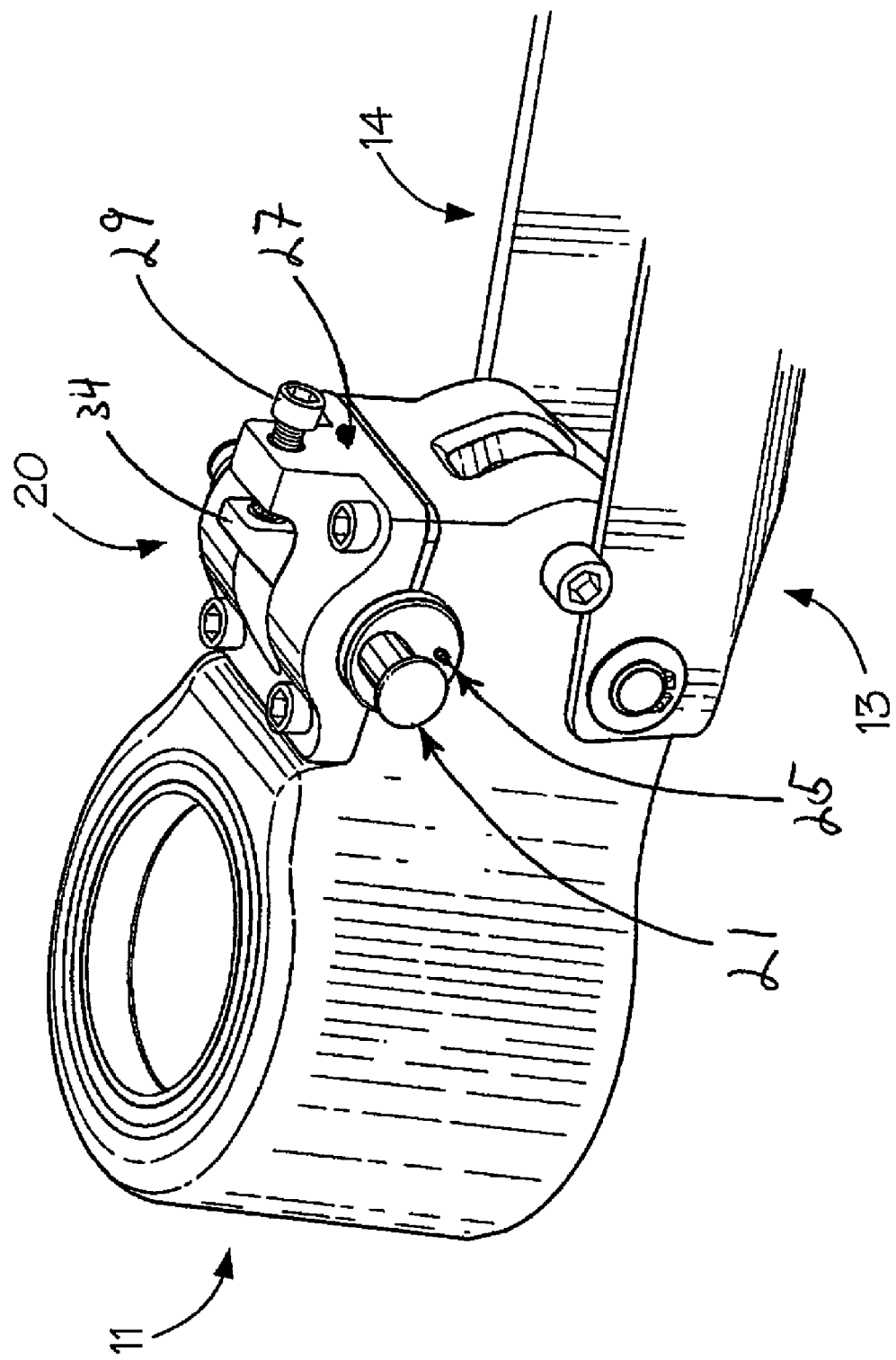
FIG. 3 shows an isometric view of flexible arm with the cover link removed.

In a dental clinical setting, the dental apparatus includes a flexible arm that operates as a stable, movable platform to assist the dental staff during clinical procedures. The invention described herein employs one or more basic concepts. For example, one concept relates to a flexible arm for a dental apparatus. A benefit of the inventive flexible arm is the ability to make fine adjustments in orientation of a one end of the arm relative to the other. More specifically, the ability to adjust or optimize the horizontal attitude of a movable end of the arm quickly and easily without resorting to expensive and time consuming remanufacture of the arm components.

Another concept relates to a method of adjusting an orientation of a flexible dental arm.

The present invention is disclosed in the context of a dental apparatus having a flexible arm such as that designed to hold trays or instruments. The principles of the present invention, however, are not limited to use within a dental apparatus or the dental or medical fields. One skilled in the art may find additional applications for the apparatus, methods, and configurations disclosed herein. Thus the illustration and description of the present invention in context of the exemplary flexible arm is merely one possible application of the present invention. However the present invention has particular applicability for use as a stable flexible support for a dental apparatus.

Components

An overview of the invention is provided below followed by a more detailed description. Referring to FIG. 1, the flexible arm 1 typically has a first body 10 connected to a movable second body 11 by a plurality of links 12, 13, 14. The links pivotly attach to the first and second bodies 10, 11 via a plurality of pivot attachments 21, 22, 23, 24 one of which has an adjustable pivot attachment location, shown as adjusting assembly 20. In a preferred embodiment, the adjustable pivot attachment 20 includes an adjusting pin 21 as represented in FIGS. 1, 2, 3 and 4. One of the plurality of links is the cover link 12 which has an inverted U-shaped cross-section which covers a gap between the first and the second bodies of the flexible arm 1. The adjusting pin 21 and the pivots 22, 23, 24 are cylindrical pins arranged in mating cutouts in the respective first body or second body. The adjusting pin 21 and the pivots 22, 23, 24 are arranged generally perpendicular to a plane of motion of the flexible arm 1. Typically, the flexible arm 1 will be arranged such that the plane of motion of the flexible arm 1 is vertical and forward, therefore the adjusting pin 21 and the pivots 22, 23, 24 are arranged substantially parallel to the horizon.

FIG. 2 shows the flexible arm 1 of FIG. 1 with the cover link 12 removed for clarity. FIG. 3 shows an isometric view of the second body 11, the adjusting assembly 20 and lower links 13, 14.

Figure 4:
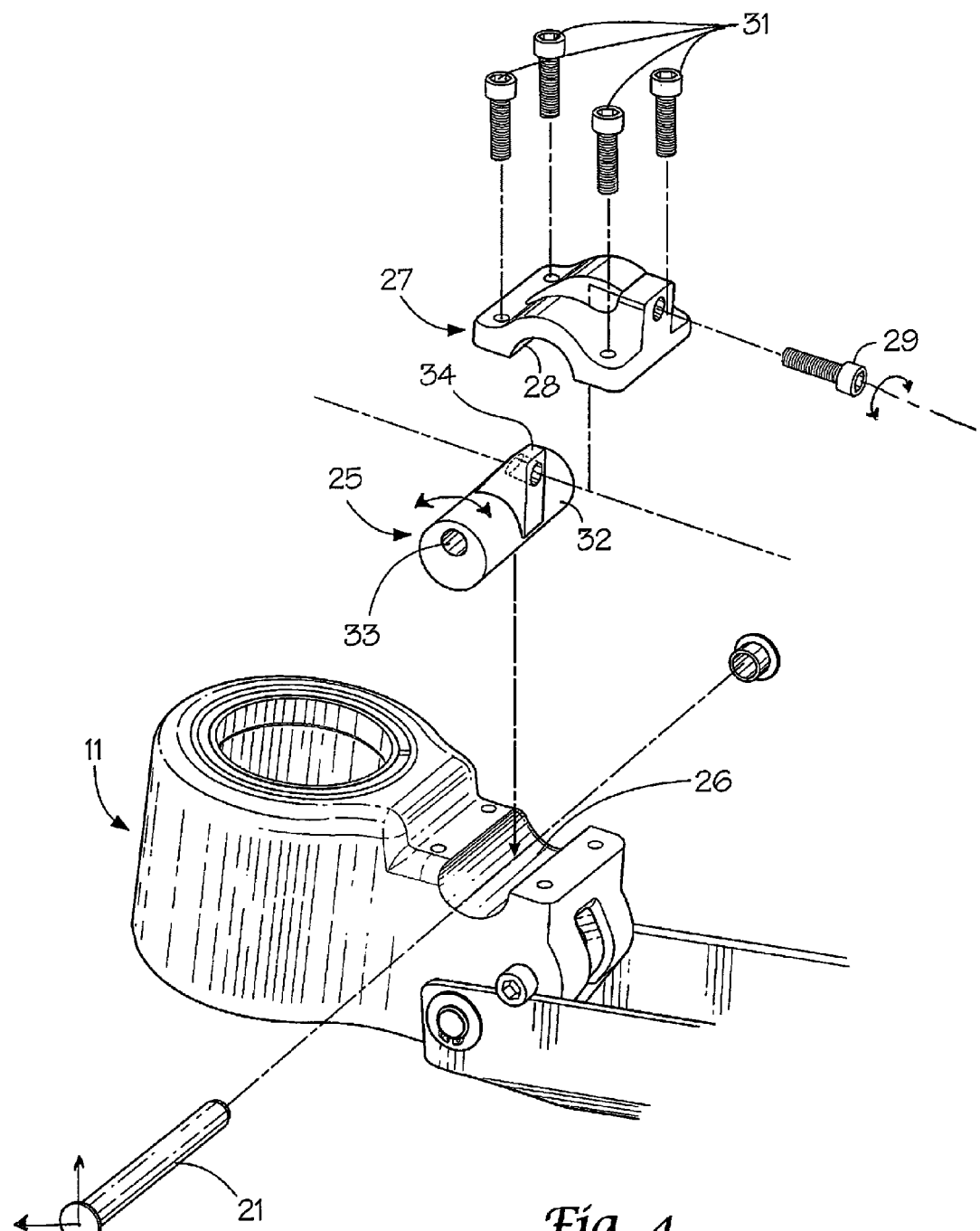
FIG. 4 shows and exploded view of flexible arm of FIG. 3.

FIG. 4 shows an exploded view of the second body 11, the adjusting assembly 20. The second body, typically has a lower bearing surface 26 arranged at one end which forms a lower bearing portion of the adjusting assembly 20. The lower bearing surface 26 can have a cylindrical profile, however the bearing geometry is not restrictive and one of ordinary skill in the art will readily appreciate that other bearing configurations are possible, such as a tapered or a double-tapered profile. The lower bearing surface 26 mates to a shaft 25 having a shaft profile 32 matching that of the lower bearing surface 26. The shaft has a hole 33 configured to mate with the adjusting pin 21 and is arranged parallel to an axis of rotation A of the shaft. The hole 33 is offset from the shaft axis of rotation A by an eccentricity distance r such that rotation of the shaft 25 causes the hole 33 and the adjusting pin 21 to translate in a plane perpendicular to the shaft axis of rotation A. The adjusting assembly 20 further comprises an upper bearing 27 having an upper bearing surface 28 that mates to the shaft profile 32. The upper bearing 27 is secured to the second body 11 by a plurality of screws 31. Together, the upper bearing 27 and the lower bearing surface 26 retain the shaft 25.

Furthermore, the shaft 25 further comprises an adjusting interface 34 that interfaces with an adjusting actuating device. The adjusting actuating device can be any suitable device that induces the shaft 25 to rotate. As illustrated the adjusting device can be an adjusting screw 29 that applies torque to the adjusting interface 34 and thereby induces the shaft 25 to rotate. In a specific embodiment, the adjusting interface 34 can be a protrusion that extends from the shaft 25. The protrusion preferably extends through an opening in the upper bearing 27 as seen in FIGS. 2, 3 and 4. The protrusion therefore can act as a lateral stop to limit any lateral motion and constrain the shaft 25 motion to be purely rotational about the shaft axis of rotation A.

Operation

A traditional 4-bar linkage provides a fixed, predetermined kinematic relationship in the form of a parallelogram linkage. The inventive flexible arm employs the first body 10, the second body 11, the cover link 12, and the lower links 13, 14 to form a modified 4-bar linkage such that the orientation of the second body 11 relative to the first body 10 is adjustable via the adjusting assembly 20.

Figure 5:
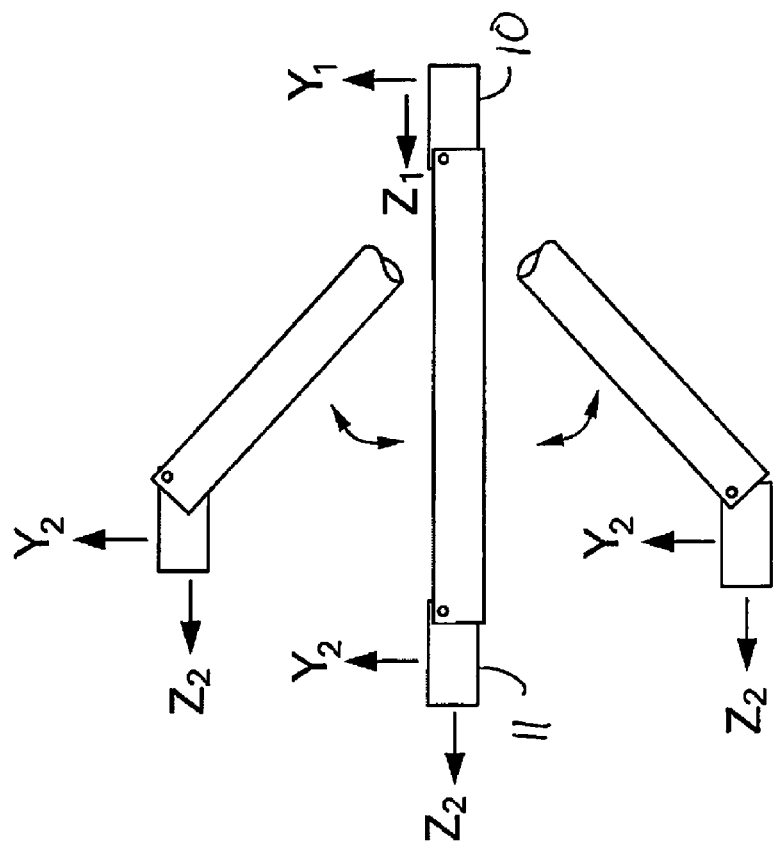
FIG. 5; shows the relationship between shaft rotation and adjusting pin translation.
Figure 6:
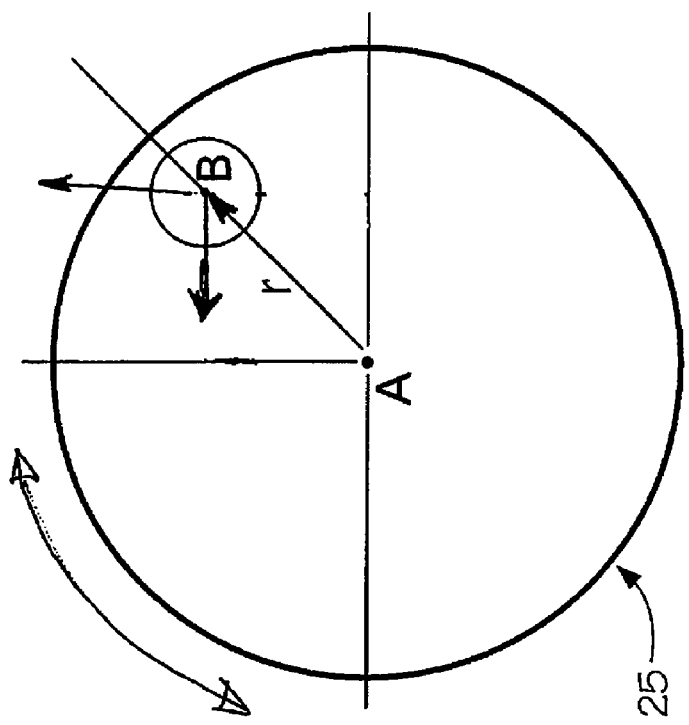
FIG. 6 shows block representation of the flexible arm in motion.

Typically, the first body 10 acts as a base to the linkage, where the second body 11 is movable relative to the first body 10. The geometric relationship of the spacing between the various pivots 21, 22, 23, 24 of the linkage determine the kinematic response of the flexible arm 1 and specifically the horizontal orientation of the second body 11. Ideally, a preset orientation of the second body 11 relative to the horizon will be maintained by the linkage as the second body 11 is moved vertically up and down as seen in FIG. 5. However, due to manufacturing tolerance variance, the distance between pivots of the various links in the linkage are not always exact resulting in a less than an optimal horizontal orientation of the second body 11.

However by use of the invention, the horizontal orientation of the second body 11 can be optimized, including in the field, by adjusting the adjusting assembly 20. When the adjusting assembly 20 is actuated, the shaft 25 is induced to rotate causing the adjusting pin 21 to translate in an arc as defined by the eccentricity r of the hole 33 and the geometry of the shaft 25 as seen in FIG. 5. Since the geometric orientation of the pivots 22, 23, 24 are predetermined with respect to themselves, the rotation of shaft 25, results in translation of the adjusting pin 21, which effectively adjusts the horizontal orientation of the second body 11 with respect to the horizon. Therefore, if the installed flexible arm 1 has a less than optimal horizontal orientation of the second body, the adjusting assembly 20 can compensate for the resultant off-optimal horizontal orientation and restore the orientation of the second body 11 to a desired optimal orientation. Referring back to FIG. 3, rotating the adjusting screw 29, causes the adjusting screw 29 to interface with the adjusting interface 34 arranged on the shaft 25, which induces the shaft 25 to rotate. The rotation of the shaft 25 causes the translation of the adjusting pin 21 as described above resulting in horizontal orientation adjustment of the second body.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

What is claimed is:

1. Dental apparatus having an articulated arm for supporting dental equipment in a horizontal orientation, said apparatus comprising:
    a base;
    a movable support having a bearing surface arranged at an end of the support;
    a shaft having
        an outer surface arranged to mate with the bearing surface of the support for rotational movement with respect thereto, and
        a bore extending along and within the shaft with its central axis being generally parallel to but off-center from the central rotational axis of the shaft;
    a pin arranged in the bore having
        an outer surface arranged to mate with the bore; and
        a plurality of links forming a parallelogram linkage connecting the support to the base with pivoting connections, with one link being pivotally connected to the pin, whereby rotation of the shaft causes translation of the pin in a plane perpendicular to the shaft axis of rotation resulting in adjustment of an angular orientation of the movable support relative to a horizon.

2. The apparatus as claimed in claim 1, wherein the pin is of cylindrical shape.

3. The apparatus as claimed in claim 2, further comprising an actuating device that rotates the shaft to a desired angular position.

4. The apparatus as claimed in claim 3, wherein the actuating device applies torque to the shaft to rotate the shaft.

5. The apparatus as claimed in claim 4, wherein the shaft comprises a stop arrangement on the shaft that interacts with the actuating device.

6. The apparatus as claimed in claim 5, wherein the actuating device is an adjusting screw.

7. The apparatus as claimed in claim 6, wherein the plurality of links comprise a four-bar linkage arrangement.

8. The apparatus as claimed in claim 7, wherein one of said links is of inverted U-shaped cross-section and acts as a cover for the arm.

9. Dental apparatus comprising an adjustable articulated arm for supporting dental equipment in a horizontal orientation, said apparatus comprising:
    a base at one end of the arm;
    a movable support at the other end of the arm having a bearing surface;
    a shaft having
        an outer surface arranged to mate with the bearing surface of the support for rotational movement with respect thereto, and
        a bore extending along and within the shaft with its central axis parallel to but off-center from the central rotational axis of the shaft;
    a pin positioned in the bore;
    a plurality of links forming a parallelogram linkage that pivotably connects the support to the base such that a generally horizontal orientation of the support is maintained relative to the base upon movement of the arm with a link of the plurality of links being pivotally connected to the pin;
    a position control device that controls a rotational position of the shaft relative to the support, wherein the position control device adjusts the horizontal orientation of the movable support relative to the base.

10. The adjustable articulated arm as claimed in claim 9, wherein the position control device comprises an actuating device that applies torque to the shaft that induces the shaft to rotate.

11. The adjustable articulated arm as claimed in claim 10, wherein the position control device further comprises a stop on the shaft that interacts with an adjusting screw.

12. The adjustable articulated arm as claimed in claim 11, wherein rotation of the shaft causes translation of the pin relative to the support.

13. The adjustable articulated arm as claimed in claim 12, wherein the actuating device is movable in a linear direction.

14. The adjustable articulated arm as claimed in claim 13, wherein the actuating device is an adjusting screw.

15. The adjustable articulated arm as claimed in claim 14, wherein the plurality of links comprise a four-bar linkage arrangement.

16. The adjustable articulated arm as claimed in claim 14, wherein one of the links is of inverted U-shaped cross-section and acts as a cover for the arm.

17. Dental apparatus comprising an adjustable articulated arm for supporting dental equipment in a horizontal orientation, the apparatus comprising:
    a base at one end of the arm;
    a movable support at the other end of the arm;
    a plurality of links forming a parallelogram linkage connecting the movable support to the base via a pair of pivot connections on each of the base and the movable support for maintaining the support in a generally horizontal orientation when the arm is moved; and
    an adjustment assembly at one of the pivot connections comprising:
        a bearing and a shaft engaging the bearing for rotational movement with respect thereto;
        a bore extending along and within the shaft, with its central axis parallel to but offset from the central axis of rotational axis of the shaft;
        a pin positioned in the bore and forming part of said one pivot connection to the linkage; and
        a position control device that controls a rotational position of the shaft relative to the bearing, wherein the position control device adjusts the horizontal orientation of the movable support relative to base.

* * * * *